United States Patent [19]

Deschenes et al.

[11] Patent Number: 4,913,730

[45] Date of Patent: Apr. 3, 1990

[54] RECOVERY OF GOLD FROM AQUEOUS SOLUTIONS

[75] Inventors: Guy Deschenes, Hull; Gordon M. Ritcey, Nepean, both of Canada

[73] Assignee: Canadian Patents and Development Ltd., Ottawa, Canada

[21] Appl. No.: 190,244

[22] Filed: May 4, 1988

[30] Foreign Application Priority Data

May 15, 1987 [CA] Canada .................................. 537316

[51] Int. Cl.⁴ ............................................. C22B 11/08
[52] U.S. Cl. ........................................ 75/370; 75/720; 423/22; 423/24
[58] Field of Search ........................ 75/0.5 A, 101 BE; 423/22, 24

[56] References Cited

U.S. PATENT DOCUMENTS

| | | | |
|---|---|---|---|
| 3,869,280 | 3/1975 | Langlois | 75/0.5 A |
| 3,877,931 | 4/1975 | Neskora et al. | 75/0.5 A |
| 4,039,327 | 8/1977 | Dietz, Jr. et al. | 75/0.5 A |
| 4,113,467 | 9/1978 | Harrington | 75/0.5 A |
| 4,539,041 | 9/1985 | Figlarz et al. | 75/0.5 A |
| 4,561,947 | 12/1985 | Schulze | 423/24 |
| 4,654,145 | 3/1987 | Demopoulos et al. | 423/24 |

OTHER PUBLICATIONS

Deschênes—CIM Bulletin, vol. 79, #895, Nov. 1986, p. 76.
Findlay in Precious Metals 1982, p. 477.
Webster et al., Jour. Phys. Chem., 61 (1957) 1245.
Maslii et al., Tsvetnye Met. 14 (1973) 79.

Primary Examiner—Upendra Roy
Attorney, Agent, or Firm—Alan A. Thomson

[57] ABSTRACT

Gold is recovered from aqueous solutions which include a solubilizing reagent by contacting the solution with hydrogen under selected conditions until the gold precipitates, and removing the precipitate from the solution. The reagent comprises a thiourea or a thiosulfate and the solution is a leach, eluate or strip solution. The contacting may be by gas sparging or under hydrogen pressures, e.g. up to about 300 psi, and usually the temperature is within about 20° to 170° C. If the initial feed solution is too dilute, it can be concentrated by ion exchange or solvent extraction followed by elution or stripping respectively. Any silver present is precipitated with the gold.

17 Claims, 2 Drawing Sheets

RECOVERY OF GOLD FROM AQUEOUS SOLUTIONS

FIELD OF THE INVENTION

This invention is concerned with recovering gold (and optionally silver) from aqueous solution derived e.g. from leaching ores or concentrates, or from concentrated versions thereof.

BACKGROUND AND PRIOR ART

There are several known techniques that can be used to recover gold and silver from aqueous solutions. Metal cementation has been used for this purpose for about one century in the cyanide industry. The Merrill-Crowe process (N.P. Finkestein, The chemistry of the extraction of gold from its ores, Gold metallurgy in South Africa, R.J. Adamson, Chamber of Mines of South Africa, Johanesburg, 284-351, 1972) uses a zinc powder to recover these metals from a cyanide solution while aluminum powder is more practical for an acid thiourea solution (A. Van Lierde, P. Ollivier and M. Lesoille, Developpement du nouveau procede de traitement pour le mineral de Salsigne, Ind. Min. Les tech., 1a, 299-410, 1982). Commercial implementation of the carbon-in-pulp and electrolysis occurred in the 1970's with some improvement of the Zadra work (Anon., Homestake uses carbon-in-pulp to recover gold from slimes, World Min., 27:12, 44-49, 1974) and is actually widely used in the gold cyanide industry.

New extraction systems are being applied (J.E. Barnes and J.D. Edwards, Solvent extraction at INCO's Acton Precious Metal Refinery, Chem. Ind., 5, 151-155, 1974; L.R.P. Reavell and P. Charlesworth, The application of solvent extraction to platinum group metals refining, ISEC 80, Liege, Belgium, 1980; R.F. Edwards, Selective solvent extractants for the refining of platinum metals, ISEC 77, CIM special volume 21, 24-31, 1979; G.B. Harris and R.W. Stanley, Hydrometallurgical treatment of silver refinery anode slimes, 10th Int. IPMI Conf., Lake Tahoe, Nevada, U.S.A., June 9-12, 1986) or proposed (G.P. Demopoulos, G. Pouskouleli and G.M. Ritcey, A novel solvent extraction system for the refining of precious metals, ISEC 86, West Germany, 1986) to recover gold and silver from precious metals refining solutions. Gold is recovered from the loaded organic by cementation, reduction with oxalic acid, hydrolytically stripped or reduced with sulphur dioxide or hydrogen.

In the development of new leaching processes to recover gold and silver from ores and concentrates, thiourea is one of the most promising reagents with its low toxicity. Having the capacity to treat mild refractory materials, thiourea leaching also saves the costs related to cyanide destruction. Its efficiency to treat a gold chalcopyrite concentrate that can not economically be treated with cyanidation was demonstrated (G. Deschênes and E. Ghali, Thiourea leaching of a gold chalcopyrite concentrate and chalcopyrite residue, CIM Ann. Conf. Met., Toronto, Ontario, Aug. 19-23, 1986). Commercialization of the thiourea process will involve development of the last step of the technique, i.e. recovery of gold (and silver) from solutions.

Different methods can be applied to recover gold and silver from an acidic thiourea solution (G. Deschênes, Literature survey on the recovery of gold from thiourea solutions and the comparison with cyanidation, CIM bull.:11, 1986). These are cementation, adsorption on activated carbon, ion exchange resins, solvent extraction and electrolysis. Raising of pH up to above 6.5 by addition of an alkaline reagent is also proposed causing precipitation (T. Odaka et al, Method of recovering gold and silver from aqueous solutions containing thiourea, gold and silver, Japanese Pat. 60-103138, June 1985). For cementation, Bodson patented the use of aluminum powder (F.J.J. Bodson, Procede de recuperation de l'argent et eventuellement de l'or contenus dans une matiere de depart solide; Canadian Pat. 1,090,141, Nov. 1980) to recover gold and silver: this procedure provides high extractions but the quality of the cement is sometimes poor. The cementation use of lead powder is inefficient in sulfuric solutions while zinc powder is inappropriate in acidic thiourea liquors. The use of activated carbon (R. Schulze, Hydrometallurgical winning of precious metals using thiourea, German Pat. DE 3401961, Aug. 1984) has two serious drawbacks: adsorption of thiourea onto carbon and difficult stripping of gold and silver. The suggested way to effectively recover gold from the carbon is to burn the loaded material but that renders the operation more expensive. Thus, there is a large unknown in thiourea desorption and carbon conditioning.

Acid cationic ion exchangers (resins) resulted in good recovery of gold with lower thiourea loading and easier stripping than activated carbon. This could be used as a purification step in thiourea processing. Solvent extraction also provided a selective and efficient recovery of gold with an easy stripping.

Raising of the pH up to above 6.5 to recover gold and silver from thiourea solution (T. Odaka, op. cit.) is not a suitable method since at such pH thiourea is less stable and decomposes. Also, the acid consumption related to this method is prohibitive because if the leach liquor has to be recycled the pH must be readjusted to 1-2. The end product (precipitate) is not expected to have a high grade.

Electrolysis was used to recover gold and silver from thiourea strip solution on a pilot plant scale (A.I. Maslii and R.Y. Bek et al, "Pilot Test and Implementation of Electrolytic Gold Extraction From Commercial Regenerated Products", TSVETN. Met. 14:18: p. 79-81, 1973). Thiourea is used in the circuit to strip a loaded anionic resin. A two-stage electrolysis has to be performed to produce high recoveries and special cell designs have to be used.

Pressure reduction potentially is an attractive avenue to gold and silver recovery from such solutions because of its selectivity and its ability to precipitate precious metals. In certain aqueous solutions, pressure reduction under hydrogen atmosphere was previously performed to recover platinum, rhodium, palladium (M. Findlay, The use of hydrogen to recover precious metals, Precious Metals 1982, M.I. El Guindy, Pergamon Press, Toronto, Ontario, 477-501, 1983) and silver (A.H. Webster and J. Halpern, Homogeneous catalytic activation of molecular hydrogen in aqueous solution by silver salts. III. Precipitation of metallic silver from solutions of various silver salts, J. Phys. Chem. 61, 1245-1248, 1957). Prior researchers found that chloride, acetate and ethylene complexes of the metals were reduced but it was not possible to precipitate precious metals from cyanide solutions because of the stability of these complexes. In certain organic media, gold and palladium were recovered by the same technique (G. Pouskouleli and G.P. Demopoulos, Direct recovery of precious metals by integration of solvent extraction and hydrogen reduction techniques. Precious Metals 1984, Toronto, Ontario, June 4–7, 1984). See also U.S. Pat. No. 4,654,145 issued Mar. 31, 1987, Demopoulos et al.

DEVELOPMENT OF PRESENT INVENTION

Our investigations yielded the results that gold and silver could be selectively reduced from their specific thiourea or thiosulfate complexes with the aid of hydrogen under certain conditions. This system is found to be particularly attractive because there is no thiourea decomposition and no acid requirement, the product is relatively pure and the barren solution has low gold and silver contents (0.1 mg/L).

One aspect of our proposal is to leach the gold ore or concentrate with an acidic thiourea solution, separate the solid from the pregnant solution, wash the solid with a thiourea solution, filter and finally send the pregnant liquor and the wash liquor to the $H_2$ reduction step to recover gold and silver. The gold powder may be sent to the MINT or refinery depending on its grade. The barren solution is recycled to the leach after bleeding for control of impurities build-up.

SUMMARY OF THE INVENTION

Figure 1:
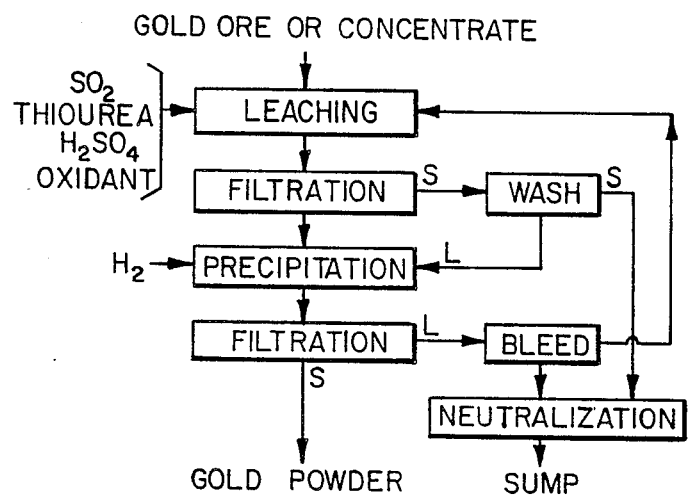
FIG. 1 is a flowsheet outlining a thiourea leach and hydrogen reduction precipitation.

The invention is directed to a process for recovering gold from aqueous solutions containing gold and a solubilizing reagent selected from thioureas and thiosulfates optionally with HCL; comprising:

(a) contacting the aqueous gold solution with hydrogen by sparging or under pressures with conditions selected so that the gold precipitates; e.g. pressures may be up to about 300 psi and temperatures up to about 170° C. optionally with the hydrogenation catalyst, and (b) recovering the gold precipitate.

The aqueous gold solution subject to the hydrogen contact precipitation may be a leach, eluate or strip solution comprising a thiourea or thiosulfate solubilizing reagent, or optionally in the case of an eluate or strip solution also comprising HCL or other acids.

Silver may be present in the feed solution and is precipitated along with the gold and separated later.

Optionally when the initial aqueous gold solution is too dilute it may be concentrated before step (a) by one or both of ion exchange and solvent extraction, followed by elution with an aqueous solution of a thiourea reagent or a thiosulfate reagent, or by stripping with an acidic solution of a thiourea reagent and/or of HCL, respectively.

Where ion exchange and/or solvent extraction steps are carried out on an initial dilute or impure solution, the solubilizing reagent in such initial solution can be a cyanide, a thiocyanate, a mineral acid or any other suitable reagent. After elution or stripping with thiourea or thiosulfate reagent, the resulting eluate or strip solution will then comprise a thiourea or a thiosulfate and can thus be treated according to the present invention.

DETAILED DESCRIPTION

The aqueous gold solution to be treated can be derived from an initial leach of a gold-containing material or can be any eluate or strip solution. The gold-solubilizing reagent present is selected from a thiourea or a thiosulfate (salt) optionally with HCL. With thiourea usually the solution is acidic with a pH in most cases being about 1–3. With thiosulfate usually the solution is at neutral or basic pH, e.g. pH about 7–10.

The thiourea reagent preferably is thiourea itself but substituted thiourea-derivatives known to complex gold may be used. Usually the thiourea is present in from about 5 to about 100–200 g/L depending on conditions.

The thiosulfate reagent is selected from the ammonium and alkali metal salts. Sodium or ammonium thiosulfate normally are preferred. Usually sodium thiosulfate is present in from about 10 to about 100 g $Na_2S_2O_3/L$.

Since HCL is very suitable for stripping gold-thiourea complexes from organic solvent extraction phase, the resulting strip solutions contain the thiourea complexes and are suitable for treatment according to this invention.

The concentration of gold in the solution subject to the hydrogen reduction preferably will be within the range of about 30 to about 120 mg/L but this is not critical e.g. from 20 mg/L to saturation can be treated. The pressure will be any value adequate for hydrogen sparging or may be within the range of about 10 to about 200 psi but higher pressures are possible, e.g. 300–400 psi. Preferably, the temperature is within the range of about room temperature to about 110° C. but higher temperatures are possible, e.g. 170° C.

The contacting in step (a) may be carried out in any suitable agitation, sparging or pressure vessel. Preferably the vessel will be adapted to allow continuous sparging of the hydrogen into the solution.

The gold precipitate may be separated by filtration or centrifugation and the gold (and any silver) recovered, for use or further purification if desired. The purity at step (b) will depend on the amount of other metals present in solution relative to the gold, and on the operation conditions.

Unexpectedly, it has been found that the thiourea is not degraded significantly by the hydrogen pressure reduction, and can be recycled.

If desired to accelerate the hydrogen reduction, or when low pressures or low temperatures are used, a hydrogenation catalyst such as Ni powder, Au powder, a Pt rod or wire, or ferrous ion may be present. The Pt will not dissolve and constitutes a preferred embodiment. However, the presence of added catalyst has been found unnecessary.

Considering FIG. 1, leaching is carried out most suitably with a solution of thiourea, $SO_2$, $H_2SO_4$ and oxidant, the leach solution filtered and the combined filtrate and wash solutions subject to $H_2$ pressure reduction followed by filtration to recover gold (and any silver) powder.

Figure 2:
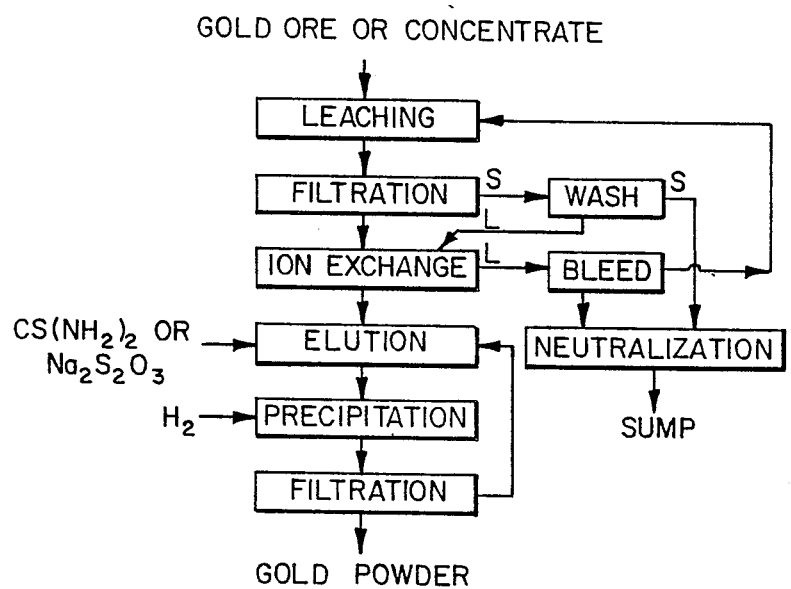
FIG. 2 is a variant flowsheet including an ion exchange-elution stage.

Considering FIG. 2, for solutions with low gold and silver contents (Au<8 mg/L, Ag<10 mg/L) acidic cationic exchangers or thiol resins are used to increase gold and silver concentrations and lower base metals content. Elution is performed with an ammonium thiosulfate or a thiourea solution and the eluate is treated with hydrogen to recover gold and silver. Base metals are removed from the resin with acid, regenerating the exchanger at the same time. The gold powder is sent to the MINT or, if further purification is desired, to a refinery. The leach solution is recycled.

Figure 3:
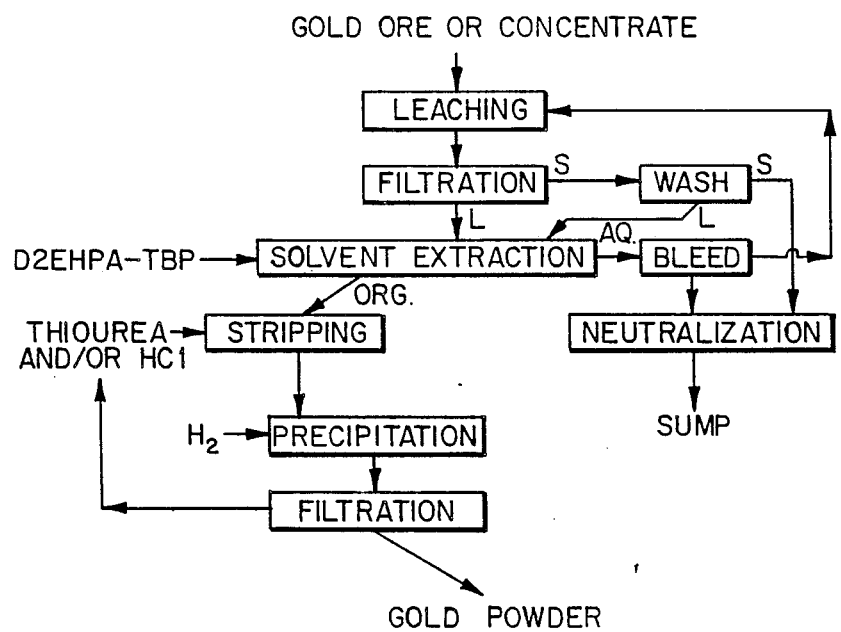
FIG. 3 is an alternative flowsheet including a solvent extraction-stripping stage.

Considering FIG. 3, for solutions with low gold and silver concentration (i.e. the same as for FIG. 2), concentration of these metals is increased by using solvent extraction and stripping, the latter being performed with acidic thiourea and/or HCL solution. If HCl alone is used for stripping, the solvent phase should contain thiourea or thiosulfate. Gold and silver are recovered from the strip solution (which will contain thiourea or thiosulfate) with hydrogen.

Thus in a further aspect of the invention, thiosulfate or thiourea solutions used as eluates or thiourea (optionally with HCl) solutions used for stripping (from other leachants than thiourea) and containing thiourea or thiosulfate and some amount of gold (50–500 mg/L) and optionally silver (idem), may be directly treated by hydrogen reduction. Gold powder is recovered by filtration and sent to the MINT or refined. The residual eluate or strip solution is suitable for recycle.

For the solvent extraction as in FIG. 3, organophosphorus extractants have been found to be preferred. Suitable extractants include phosphoric acid, phosphonic acids and phosphinic acids and their alkyl, particularly dialkyl derivatives. Trialkylphosphates preferably are added as modifiers. The organic phase usually includes a diluent suitably a liquid hydrocarbon immiscible with water. A preferred extractant is di-(2-ethylhexyl) phosphoric acid (D2EHPA) 40% —tributylphosphate 10% —Varsol (trademark) 50%.

For the ion exchange as in FIG. 2, any cation exchange resin (acidic) may be used, e.g. of sulfonic, carboxylic or chelating type. The Au complex with thiourea or thiosulfate is cationic. Where the ion exchange is carried out on a cyanide or thiocyanate system, an anion exchange resin is used because of the anionic complex formed with Au. Various suitable ion exchange resins are known to those skilled in this art.

Where a high purity product is desired after the $H_2$ reduction, a combination of ion exchange and solvent extraction may be used.

The following examples are illustrative.

A synthetic gold thiourea solution was prepared using double distilled water. The pH of the solution was adjusted by addition of concentrated sulfuric acid (ACS grade). Thiourea (ACS grade) was dissolved in the acidic media. The gold-thiourea complex was prepared by adding gold chloride to this solution (see Table 1).

The leach solutions were obtained by contacting a gold chalcopyrite concentrate and a gold arsenopyrite concentrate with a thiourea solution. Ferric sulphate was used as oxidant for the arsenopyrite leach and hydrogen peroxide for the chalcopyrite leach. Sulfuric acid was used to acidify and control the pH value. Loading of the resin (cation exchange) was run by contacting 150 mL of HCR-S (Dowex - trademark) resin with 1.5 L of solution in a 3 L flask agitated with an incubator shaker (orbital) for 60 min at 250 rpm and 25° C. The solution was filtered and the resin was contacted with 500 mL of $Na_2S_2O_3$ 5%, pH 9.9, 25° C., for 2 hr for the elution. The same apparatus was used for loading and elution.

Solvent extraction was performed using D2EHPA 40%—TBP 10% in varsol (trademark for an aliphatic hydrocarbon solvent) where D2EHPA=di-(2-ethylhexyl)phosphoric acid, and TBP=tributylphosphate.

Extraction was run during 2 min at 25° C. with a ratio A/O of 1. The organic was filtered.

A standard 1-L titanium Parr autoclave was used to carry out batch reduction tests for aqueous solutions. A glass liner was used and metallic immersed parts were either titanium grade 12 or un-alloyed titanium with an oxidized surface to prevent corrosion. A stainless steel impeller SS 316 was occasionally used. The solution was filtered just before experiments using a Millipore (trademark) filter (0.45 µm pores). The autoclave was purged with high purity nitrogen and heated to the appropriate temperature. Introduced through an inlet tube immersed in solution, high purity hydrogen was used to purge nitrogen when the desired temperature level was reached and then hydrogen pressure was set at the desired level and stirring was started. The pressure was maintained constant throughout the test. Samples were drawn at convenient time intervals, filtered with Millipore filters (0.45 µm) and analysed by ICP (Inducted Coupled Plasma Furnace) for gold and occasionally for silver. Atomic absorption spectroscopy (AAS) was used for other metals analysis.

Thiourea analysis of the solution was performed by titration with potassium iodate using an iodine selective electrode (G. Deschenes and E. Ghali, op. cit.). Hydrogen was removed by nitrogen sparging to avoid interference problems during titration.

The following Table 1 shows the composition of the thiourea solutions used for the experiments.

TABLE 1

Composition of the thiourea solutions used for pressure reduction tests

| COMPOSITION | SOLUTION | | | |
| --- | --- | --- | --- | --- |
| | Arseno-pyrite | Chalco-pyrite | Syn-1 | Syn-2 |
| Thiourea (g/L) | 7.0 | 5.7 | 8.0 | 7.0 |
| pH | 1.1 | 1.1 | 1.1 | 1.3 |
| Au (mg/L) | 40 | 47 | 102 | 103 |
| Ag (mg/L) | 1.0 | 6.2 | 33 | — |
| Fe (g/L) | 9.2 | 2.7 | 2.1 | — |
| Cu (mg/L) | 40 | 120 | 43 | — |
| Pb (mg/L) | — | — | 11 | — |
| Zn (mg/L) | — | — | 45 | — |
| As (g/L) | 8.0 | — | — | — |

EXAMPLE 1

A gold arsenopyrite concentrate was leached using a thiourea solution acidified with $H_2SO_4$ and using ferric sulfate as oxidant. The pulp was filtered and the solution was pressurized in a titanium autoclave at 300 psi and 95° C. during 6 hrs. Stirring was maintained at 450 rpm. A stainless steel stirrer was used.

The following Table 2 shows the analysis of the starting and the final solution.

TABLE 2

| | Starting Solution | Final Solution | Recovery % |
| --- | --- | --- | --- |
| Thiourea | 7.0 | 7.0 | N.A. |
| pH | 1.1 | 1.1 | N.A. |
| Au (mg/L) | 40 | 1.2 | 97.0 |
| Ag (mg/L) | 1.0 | 0.1 | 90.0 |
| Fe (g/L) | 9.2 | 9.1 | 1.1 |
| Cu (mg/L) | 40 | 20.1 | 49.7 |

No detectable thiourea decomposition occurred during the step. Approximative composition of the solid residue was obtained by mass balance using the solutions analysis and also x-ray fluorescence spectroscopy on the residue. Estimate of the composition showed 55% Au, 1% Ag, 28% Cu, 14% S and about 1% Fe.

EXAMPLE 2

A gold chalcopyrite concentrate was leached with a thiourea solution containing sulfuric acid and $SO_2$. Hydrogen peroxide was used as oxidant. The pulp was filtered and the leach liquor was pressurized under hydrogen at 300 psi and 95° C. for 4 hrs. Stirring was maintained at 450 rpm. Nickel powder (30 mg/L) was added to activate the reduction.

The following Table 3 shows the composition of the initial and final solutions.

TABLE 3

|  | Starting Solution | Final Solution | Recovery % |
|---|---|---|---|
| Thiourea (g/L) | 5.7 | 5.7 | N.A. |
| pH | 1.1 | 1.0 | N.A. |
| Au (mg/L) | 47 | 0.9 | 98.1 |
| Ag (mg/L) | 6.2 | 1.0 | 83.8 |
| Fe (g/L) | 2.7 | 2.7 | — |
| Cu (mg/L) | 120 | 97 | 19.2 |

Using the same method (analysis of solutions and x-ray fluorescence spectroscopy of the residue) showed the following approximate composition of the solid residue: 60% Au, 6.7% Ag, 30% Cu, 3% Ni and 0.2% Fe.

EXAMPLE 3

A synthetic solution containing sulfuric acid, thiourea, gold, silver, iron, copper, lead and zinc was reduced during 4 hrs at 300 psi, 95° C. and 450 rpm (stainless steel stirred SS 316). After the test, the solution was filtered; the liquor was analysed for the metals content and the solid for gold and silver content. The following Table 4 presents the results of the test.

TABLE 4

|  | Starting Solution | Final Solution | Recovery % |
|---|---|---|---|
| Thiourea (g/L) | 8.0 | 8.0 | N.A. |
| pH | 1.0 | 0.97 | N.A. |
| Au (mg/L) | 102 | 0.4 | 99.6 |
| Ag (mg/L) | 33 | <0.1 | 99.7 |
| Cu (mg/L) | 43 | 41 | 4.6 |
| Pb (mg/L) | 11 | 11 | — |
| Zn (mg/L) | 45 | 45 | — |

Analysis of the filtrate by fire assay showed that the residue contained 31% Au and 8% Ag.

EXAMPLE 4

A synthetic gold thiourea solution containing 100 mg/L Au and 7.0 g/L thiourea was reduced at 300 psi, 95° C. and 450 rpm for 4 hrs. Nickel powder (40 mg/L) was added to activate the reduction. The following Table 5 shows the results.

TABLE 5

|  | Starting Solution | Final Solution | Extraction % |
|---|---|---|---|
| Thiourea (g/L) | 7.0 | 7.0 | N.A. |
| pH | 1.3 | 1.6 | N.A. |
| Au (mg/L) | 103 | 0.2 | 99.8 |

Analysis of the residue by XRFS (X-Ray Fluorescence Analysis) showed that the gold precipitate was at least 90% Au, the remaining 10% was impurities caused by erosion/abrasion of the autoclave.

EXAMPLE 5

A strong acid cationic resin (Dowex HCR-S) was loaded by contacting the exchanger with a gold-thiourea aqueous solution. The loaded resin was stripped with a $Na_2S_2O_3$ 5% solution of pH 9.9. The strip solution was pressurized under hydrogen to recover gold (363 psi, 95° C., 4 hrs). The initial and final gold contents were, respectively, 52.5 mg/L and 26.1 mg/L. About 50% of the gold was recovered by this hydrogen reduction. The remaining solution normally will be recycled to the pressurized hydrogen step.

EXAMPLE 6

A synthetic gold thiourea solution containing 100 mg/L Au and 6.9 g/L thiourea was reduced at 10.8 psi $H_2$, 28° C. and with agitation at 450 rpm for 4 hrs. Nickel powder (40 mg/L) was added initially to activate the reduction.

Thiourea analysis by titration showed that no thiourea was decomposed during the test. Analysis of gold in solution with ICP showed that 97% gold was recovered as precipitate, after the four hours.

We claim:

1. A process for recovering gold from aqueous solutions containing gold and a thiourea or a thiosulfate solubilizing reagent, optionally with HCL; comprising:
   (a) contacting the aqueous gold solution with hydrogen by sparging or under pressures, with conditions selected so that the gold precipitates, and
   (b) recovering the gold precipitate.

2. The process of claim 1 wherein the aqueous gold solution is a leach, eluate or strip solution comprising a thiourea solubilizing reagent.

3. The process of claim 1 wherein the aqueous gold solution is an eluate or strip solution comprising a thiourea or a thiosulfate solubilizing reagent.

4. The process of claim 1 wherein the conditions during step (a) are controlled to avoid decomposition or alteration of the thiourea reagent and the reagent recovered and recycled.

5. The process of claim 1 wherein a selected hydrogenation catalyst is present during step (a).

6. The process of claim 1 wherein silver is present in the solution and is precipitated with the gold in step (a), and later separated.

7. The process of claim 1 wherein during step (a) the pressure is below about 300 psi and the temperature below about 170° C.

8. The process of claim 1 wherein the hydrogen is sparged into the solution throughout step (a).

9. The process of claim 1 wherein the aqueous solution treated in step (a) has a gold concentration within the range of about 30 to about 120 mg/L.

10. The process of claim 1 wherein the aqueous gold solution has a pH of about 1-3 for a thiourea solution and about 7-10 for a thiosulfate solution.

11. The process of claim 1 wherein in step (b) the gold is recovered by filtration or centrifugation.

12. The process of claim 1 wherein the initial aqueous gold solution is a dilute leach solution which is concentrated before step (a) by one of ion exchange and solvent extraction, followed by elution with an aqueous solution of a thiourea reagent or a thiosulfate reagent, or by stripping with an aqueous solution of a thiourea reagent or of HCL, respectively, the eluate or strip liquor being treated in step (a).

13. The process of claim 1 wherein the contact in step (a) is with continuous hydrogen sparging at close to atmospheric pressure.

14. The process of claim 2 wherein during step (a) thiourea is present in a concentration of from about 5 to about 100–200 g/L depending on conditions.

15. The process of claim 2 wherein the thiourea reagent comprises thiourea.

16. The process of claim 3 wherein the thiosulfate reagent comprises sodium, potassium or ammonium salts thereof.

17. The process of claim 5 wherein the hydrogen pressure is close to atmospheric and the temperature is close to room temperature.

* * * * *